United States Patent
Desai et al.

(10) Patent No.: US 9,888,022 B2
(45) Date of Patent: Feb. 6, 2018

(54) PROVIDING APPLICATION-SPECIFIC THREAT METRICS

(71) Applicant: International Business Machines Corporation, Armonk, NY (US)

(72) Inventors: Vikas B. Desai, Singapore (SG); Carsten Hagemann, Ashmore (AU); Christopher J. Hockings, Burleigh Waters (AU); Mark D. Johnston, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/955,546

(22) Filed: Dec. 1, 2015

(65) Prior Publication Data
US 2017/0155673 A1 Jun. 1, 2017

(51) Int. Cl.
*G06F 11/00* (2006.01)
*H04L 29/06* (2006.01)

(52) U.S. Cl.
CPC ................................ *H04L 63/1425* (2013.01)

(58) Field of Classification Search
CPC ............. H04L 63/1416; H04L 63/1425; H04L 63/1433; H04L 63/145; G06F 21/55; G06F 21/56
USPC ............................... 726/22–26; 713/188, 194
See application file for complete search history.

(56) References Cited

U.S. PATENT DOCUMENTS

| | | | | |
|---|---|---|---|---|
| 7,084,760 | B2* | 8/2006 | Himberger | G06F 21/552 340/4.3 |
| 8,458,793 | B2* | 6/2013 | McKenna | G06F 21/55 709/224 |
| 8,522,350 | B2* | 8/2013 | Davenport | G06F 21/54 709/223 |
| 8,806,644 | B1 | 8/2014 | McCorkendale et al. | |
| 8,875,289 | B2 | 10/2014 | Mahaffey et al. | |
| 8,904,477 | B2* | 12/2014 | Barton | G06F 21/604 380/270 |
| 8,984,628 | B2* | 3/2015 | Mahaffey | G06F 21/564 713/187 |
| 8,984,632 | B1 | 3/2015 | Laffoon et al. | |

(Continued)

OTHER PUBLICATIONS

"Getting started with AppScan Dynamic Analyzer", IBM Bluemix, Last Updated: Jun. 28, 2015, <https://www.stage1.ng.bluemix.net/docs/#services/AppScanDynamicAnalyzer/index.html>, 1 page.

*Primary Examiner* — Hosuk Song
(74) *Attorney, Agent, or Firm* — David B. Woycechowsky (57) ABSTRACT

Assessment of threat risks associated with a given mobile device application (app) on a device type specific basis, so that the threat assessment is specific to a particular device type that is suitable for running the given app. The assessed device-type-specific risk is represented as device-type-specific risk metadata, which is associated as metadata with the given app. For example, the metadata may be stored along with the given app in a common repository that includes many apps. In some embodiments, the device-type-specific risk metadata is generated and stored comprehensively for all apps and device types used in an enterprise. The device-type-specific risk assessment, and corresponding device-type-specific risk metadata, may be based upon run time behavior of the given app on a given device type.

18 Claims, 4 Drawing Sheets

(56) References Cited

U.S. PATENT DOCUMENTS

| | | | |
|---|---|---|---|
| 9,003,544 B2* | 4/2015 | Nevstruev | G06F 21/6245 726/1 |
| 9,043,924 B2* | 5/2015 | Maor | G06F 11/3688 726/25 |
| 9,411,963 B2 | 8/2016 | Robke et al. | |
| 2013/0167231 A1 | 6/2013 | Raman et al. | |
| 2013/0340084 A1 | 12/2013 | Schrecker et al. | |
| 2014/0006164 A1 | 1/2014 | Bellegante et al. | |
| 2014/0122651 A1 | 5/2014 | Hsu et al. | |
| 2015/0143455 A1 | 5/2015 | Bettini et al. | |

* cited by examiner

PROVIDING APPLICATION-SPECIFIC THREAT METRICS

BACKGROUND

The present invention relates generally to the field of countering software security risks (for example, malware) associated with mobile applications (herein called "mobile apps").

It is recognized that unethical parties (sometimes called hackers) attempt to use "fraudware" (herein defined as any software, data and/or computer network communications helpful in committing a financial fraud) to commit financial fraud. This fraudware may be directed at a large enterprise from: (i) a mobile device belonging to a hacker; and/or (ii) a mobile device of a customer, or other associate of the large enterprise, that has received fraudware without the owner of the mobile device realizing it.

A mobile application (app) is computer software that runs on a mobile device such as a smartphone or a tablet computer. Examples of mobile apps include web browsers, email applications, calendar management apps, video and audio recording and/or playback apps, and vendor proprietary apps such as banking applications.

SUMMARY

According to an aspect of the present invention, there is a method, computer program product and/or system for use with a first mobile device application (first app) suitable for running on devices of at least a first device type that performs the following operations (not necessarily in the following order): (i) collecting first-device-type risk-relevant data associated with the first app from a first plurality of devices, with each device of the first plurality of devices being of the first device type; (ii) analyzing the first-device-type risk-relevant data to generate first-device-type risk characteristic data corresponding to the first device type; and (iii) associating the first-device-type risk characteristic data as first risk metadata with the first app.

DETAILED DESCRIPTION

Some embodiments of the present disclosure assess threat risks associated with a given "mobile device application" (or, "app," see definition, below, in the definitions sub-section of this Detailed Description section) on a "device type" (see definition, below, in the definitions sub-section of this Detailed Description section) specific basis, so that the threat assessment is specific to a particular device type that is suitable for running the given app. The assessed device-type-specific risk is represented as device-type-specific risk metadata, which is associated as metadata with the given app. For example, the metadata may be stored along with the given app in a common repository that includes many apps. In some embodiments, the device-type-specific risk metadata is generated and stored comprehensively for all apps and device types used in an "enterprise" (see definition, below, in the definitions sub-section of this Detailed Description section). The risk assessment may be based upon run time behavior of the given app on a given device type.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
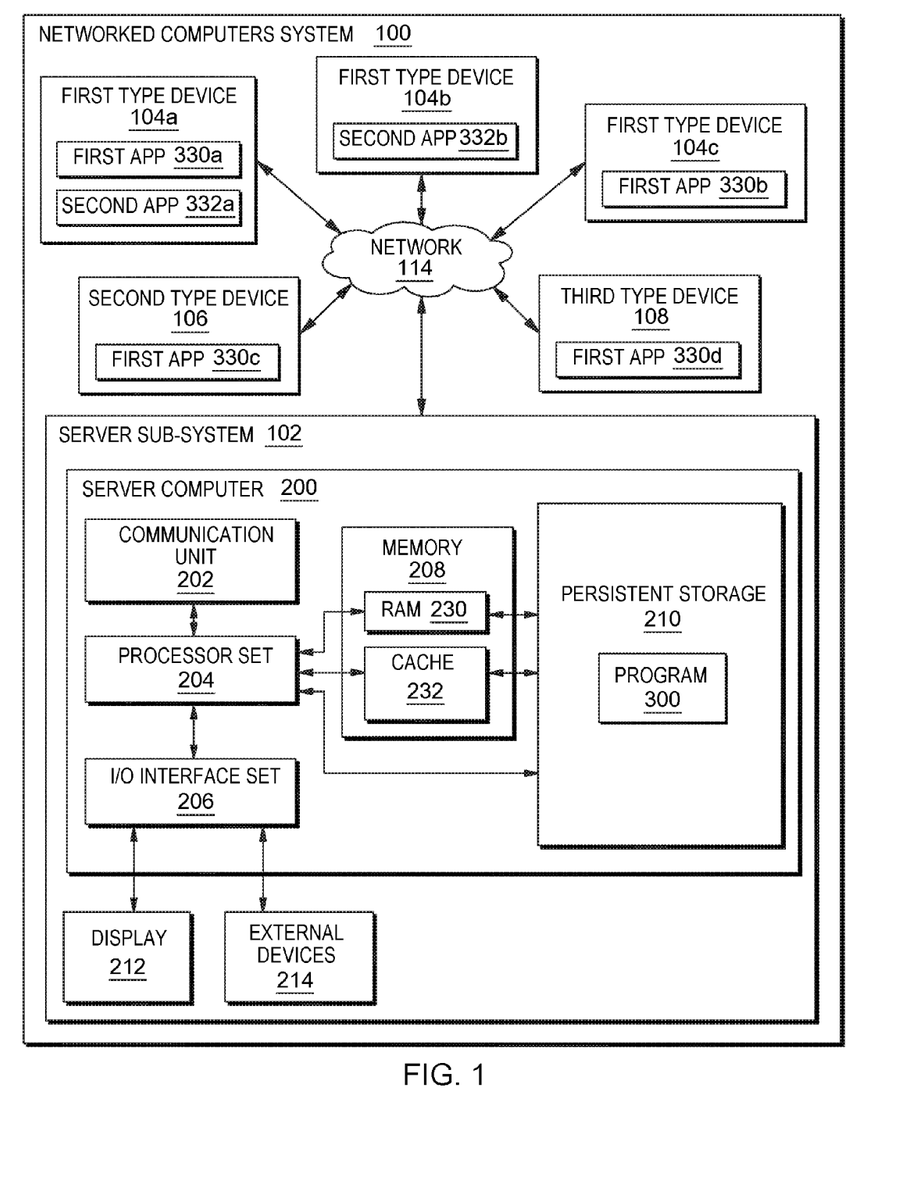
FIG. 1 is a block diagram of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; first type mobile devices 104a, b, c; second type mobile device 106; third type mobile device 108; first instantiation of first app 330a; second instantiation of first app 330b; third instantiation of first app 330c; fourth instantiation of first app 330d; first instantiation of second app 332a; second instantiation of second app 332b; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
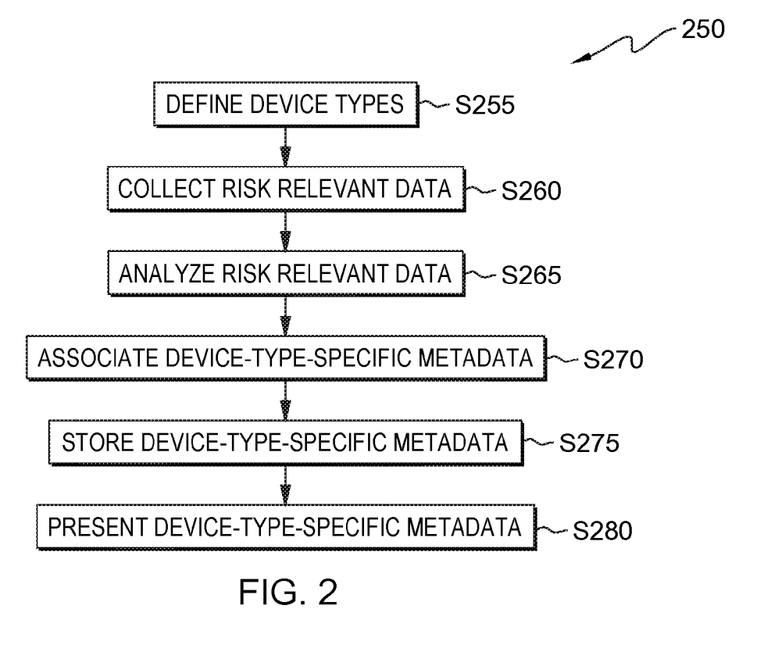
FIG. 2 is a flowchart showing a first embodiment method performed, at least in part, by the first embodiment system.
Figure 3:
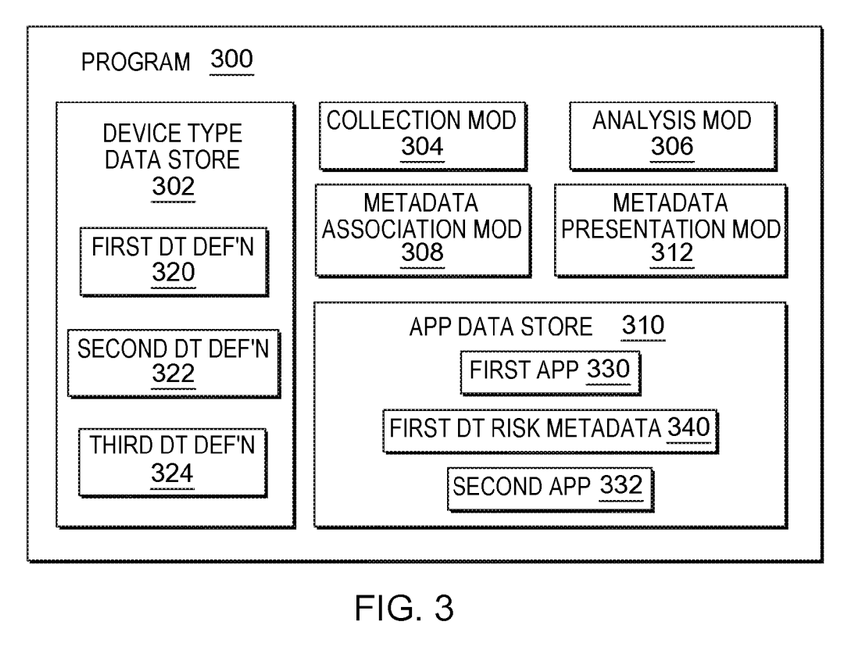
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where device type data store 302 stores definitions 320, 322, 324 for each device type present in system 100. "Device type" is defined, below, in the Definitions sub-section of this detailed description section. In this example: (i) first type devices 104a, 104b and 104c meet first device type definition 320 because each have similar (or identical) hardware configurations, similar (or identical) firmware configurations and similar (or identical) software configurations; (ii) second type device 106 does not meet first device type definition 320 because its software configuration is different, in a manner relevant to threat risks, than the software configuration(s) allowed by first device type definition 320; and (iii) third type device 108 does not meet first device type definition 320 because its hardware configuration is different, in a manner relevant to threat risks, than the hardware configuration(s) allowed by first device type definition 320.

In method 250, the various mobile devices are classified according to device types because, as will be further explained below, method 250 is used to obtain risk metadata specific to the first device type. Risk metadata specific to the second and third device types may also be generated and stored, but that is outside the scope of method 250 now under discussion. Below, in the Further Comments And/Or Embodiments sub-section of this Detailed Description section, an embodiment will be discussed where device-type specific risk metadata is generated and stored for every device type used in an enterprise.

Processing proceeds to operation S260, where collection mod 304 collects "risk-relevant data" relating to the installation, updating, maintenance and/or running of: (i) first app instantiation 330a on first type device 104a; and (ii) first app instantiation 330b on first type device 104c (see FIG. 1). This risk-relevant data may include some, or all, of the following types: (i) run time behavioral data relating to operation of the device when running the first app; (ii) installation time behavioral data relating to operation of the device when installing the first app; (iii) update time behavioral data relating to operation of the device when updating the first app; (iv) uninstall time behavioral data relating to operation of the device when uninstalling the first app; (v) configuration change data relating to configuration changes observed in the device after the first app is installed and/or updated; (vi) data change data relating to data first observed on the device after the first app is installed and/or updated;

and/or (vii) any other type of data relevant to threat risks that may be occasioned, in whole or in part, by the presence and/or running of the first app on the first type device.

During operation S260, risk-relevant data is not collected for first type device 104b because: (i) data is being collected to generate risk metadata to be associated with the first app; and (ii) first type device 104b does not run an instantiation of first app 330.

During operation S260, risk-relevant data is not collected from second type device 106 and/or third type device 108 because: (i) data is being collected to generate device-type-specific risk metadata for the first device type; and (ii) devices 106, 108 are not devices of the first device type. As mentioned above, risk metadata may be generated for the second and third device types, but this is outside the scope of method 250 now under discussion.

Processing proceeds to operation S265, where analysis mod 306 analyzes the risk-relevant data specific to first app 330 and first device type 320 to generate risk characteristic data based on the risk-relevant data collected at operation S260. This risk characteristic data is specific to the first app and also specific to the first device type (because it is based on data collected only from devices of the first device type). Risk characteristic data may be generated for other apps and/or device types, but this is outside the scope of method 250 now under discussion. Some specific ways that risk characteristics may be generated based on risk-relevant data will be discussed, below, in the Further Comments And/Or Embodiments sub-section of this Detailed Description section.

Processing proceeds to operation S270, where metadata association module 308 associates the first-device-type-specific risk characteristic data to be associated as metadata with the first app. In this embodiment, this means instructing the first-device-type-specific risk characteristic data to be stored as metadata associated with the first app.

Processing proceeds to operation S275, the first-device-type-specific risk characteristic data is stored as first-device-type-specific risk metadata 340 associated with first app 330 in: (i) app data store 310; and (ii) in all instantiations of the first app that are being run on a first type device (in this example, specifically, first type devices 104a and 104c (see FIG. 1)). Alternatively, or additionally, there may be other locations (for example, distributed repositories, not shown in FIG. 1) where first-device-specific risk metadata 340 is stored in an associated manner with copies of first app 330.

Because method 250 does not determine any risk metadata for second app 332, there is no metadata block bordering on second app block 332 in FIG. 1. However, device-specific risk metadata could be generated for the second app (this is just not within the scope of method 250).

Because method 250 does not determine any risk metadata for the second or third device types with respect to second app 332b, there is only a first-device-type-specific metadata block 340 bordering on first app block 330 in FIG. 1. However, device-specific risk metadata for the second and third device types could be generated for the first app (assuming that second and third type devices are running the first app). Once again, this is outside of the scope of method 250, but will be discussed, below, in the Further Comments And/Or Embodiments sub-section of this detailed description section.

Processing proceeds to operation S280, where metadata presentation mod 312 instructs the first-device-type-specific risk metadata 340 to be presented to user(s) in human understandable form (for example, as a text-based display, as audio data). In this example, the presentation is made to the users of devices 104a and 104c. Additionally or alternatively, metadata 340 could be presented to other people (for example, a system administrator of system 100). In this example, the presentation is made to the users: (i) when risk metadata 340 is initially generated by method 250; and (ii) every time first device-type specific risk metadata 340 is updated. Alternatively or additionally, first-device-type-specific risk metadata 340 could be presented when an instantiation of the first app is initially installed, updated and/or uninstalled on any first type device. Based on the presentation of metadata 340, a user may better decide: (i) whether, or how, to install the first app (for example, install the first app only after a firmware update is in place); (ii) whether and/or how to update the first app; (iii) whether and/or how to uninstall the first app (for example, run a malware repair program after uninstalling the first app); and/or (iv) make other decisions related to the management of the first app.

In this embodiment, first-device-type-specific risk metadata 340 is presented to human users in human understandable form. Alternatively or additionally, metadata 340 may be communicated to other machine logic to cause measures to be taken automatically (that is, at least substantially without human intervention) on first device type devices running, installing, updating and/or uninstalling the first app in order to better minimize risk based on the content of metadata 340.

III. Further Comments and/or Embodiments

Some embodiments of the present invention may include one, or more, of the following features, characteristics and/or advantages: (i) makes consumers aware that their devices are vulnerable to attack; (ii) helps to prevent a consumer device from becoming infected with malware and surreptitiously playing a role in a fraud campaign; (iii) protects against vulnerabilities relative to application programs (apps) which are enabled for automatic update; (iv) informs a consumer that an app, or action they are about to take on their device, will render the device vulnerable; (v) gives the consumer a choice to proceed with, or stop an action, based on known threats presented by an app version, as exhibited across devices where the app version is already installed; (vi) consider characteristics of an app that a user wants to install; (vii) focus on an app either at installation time or when it is running; (viii) analyze run time characteristics of an app across multiple devices; and/or (ix) present the risk characteristics that an app represents to their device.

A method according to the present disclosure includes the following operations: (i) collect and report app behavioral data (such as external uniform resource locators, URLs, accessed, etc.) to a central repository (for example, an app store); (ii) the central repository correlates app (across installed devices) behavioral data against known threat intelligence sources (for example a threat intelligence sharing platform that can be used to research security threats, to aggregate intelligence, and to collaborate with peers; (iii) associate identified threat categories with app metadata within the repository; and/or (iv) display (to consumers or users) app metadata representing known threats for requested app operations (such as, "install" or "update").

Some embodiments of the present invention extend conventional technology as follows: (i) high risk device operations (for example, an app update) are monitored to identify maliciously introduced versions of the app; and/or (ii) the impact to an overall security posture is assessed with respect to a user's mobile device, as a reflection of imminent app operations. Further with respect to item (ii) above, if the user has enforced caution around the app installation processes, some embodiments of the present invention apply that same insight into the installation or update of an app, as it applies to the user's platform. Some embodiments focus on assessing the app risk. However, when applied to the action of installation, the user should be made aware of the impact on their own device. For example, if the device has existing apps already installed that are known to communicate with anonymous proxies, and the new app includes that risk, the user might accept or reject installation of the new app based on that information.

Some embodiments of the present invention may include one, or more, of the following features, characteristics and/or advantages: (i) allows users to be notified (and to reject or consent to installation/update) of apps that are associated with known threats; (ii) gives users information about their device's susceptibility to threats/malware; (iii) enables users to keep their devices free of apps associated with known malware; (iv) increases trustworthiness in app stores and device providers; and/or (v) lessens the level of threats to an enterprise (fewer devices infected with malware and/or apps associated with known threats).

Figure 4:
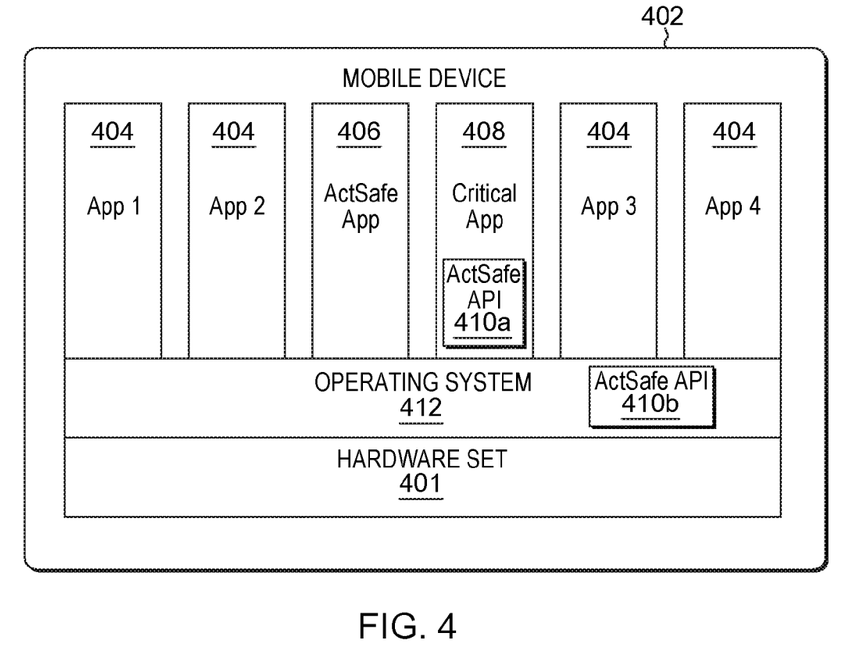
FIG. 4 is a is a block diagram of a mobile device portion of a second embodiment of a system according to the present invention.
Figure 5:
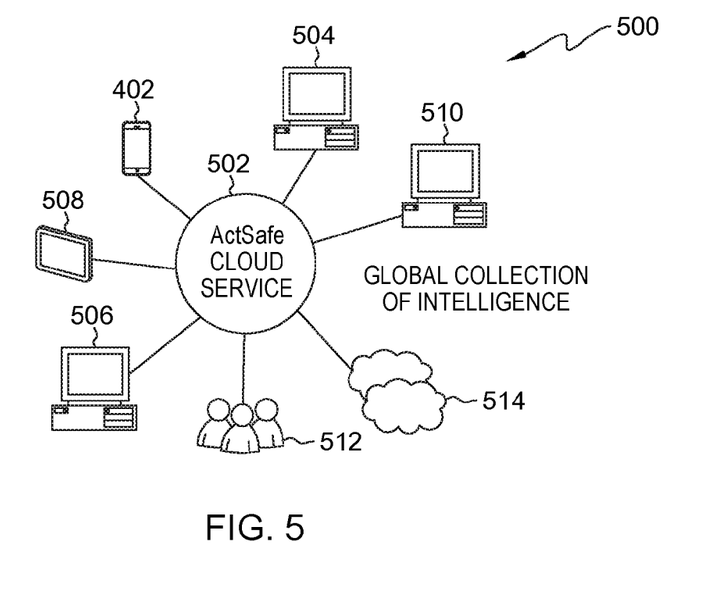
FIG. 5 is a block diagram of the second embodiment system.
Figure 6:
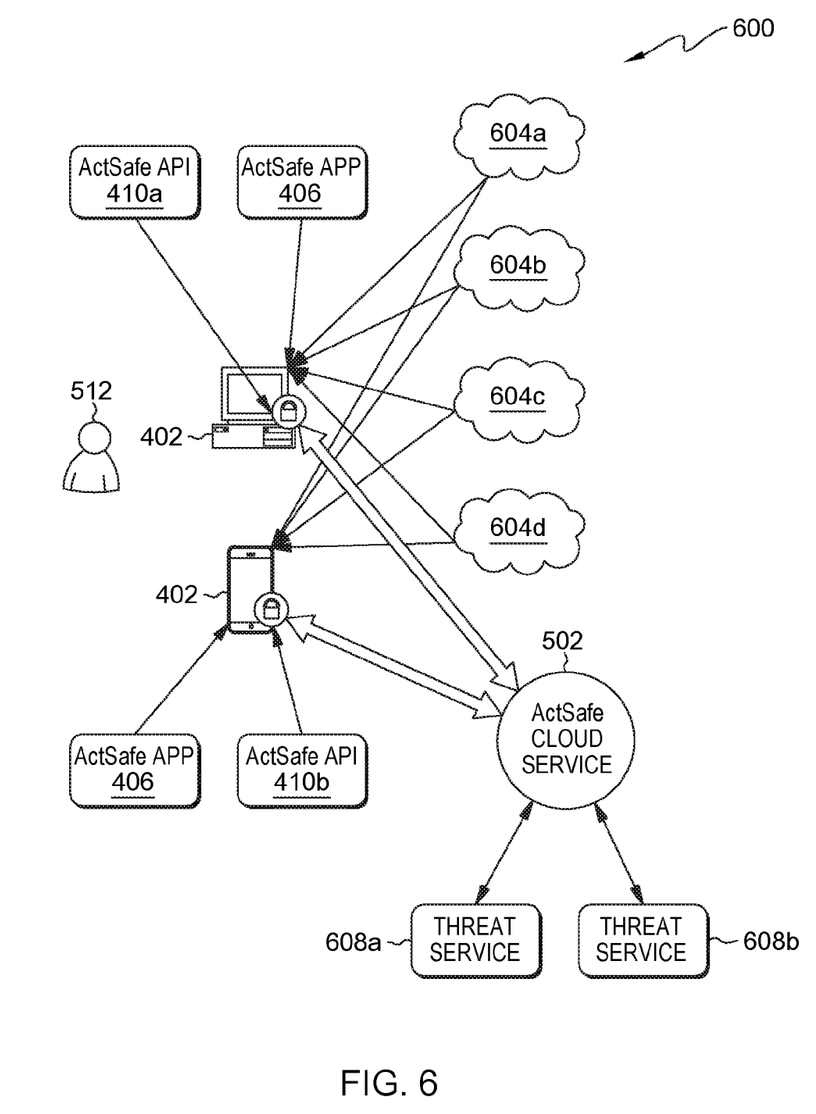
FIG. 6 is another block diagram of the second embodiment system.

As shown in FIGS. 4, 5 and 6, an embodiment of ActSafe system 600 includes: hardware set 401; mobile device system 402; various apps 404; ActSafe app 406; critical app 408, ActSafe application programming interface (ActSafe API) 410a, 410b, collectively 410; mobile device operating system 412; networked environment 500; ActSafe cloud service 502; desktop computer 504; laptop computer 506; tablet computer 508; ActSafe administrator's computer 510; user 512; cloud 514 (a large interconnected network of computers such as, for example, the internet); various app stores 604a, b, c, d; and various threat services 608a and 608b. Alternatively, mobile device system 402 could be a desktop, laptop or other type of computer (now known or to be developed in the future).

As shown in FIG. 6, ActSafe cloud service 502 is shown separately from an app store 604a that delivered app 408 to device 402 at installation time. Alternatively, the ActSafe cloud service is embedded as part of an app store, app store 604a for example, to differentiate the app store from other app stores for reasons of competitive advantage).

The mobile apps 404, ActSafe app 406, and critical app 408 run on the platform of mobile device operating system 412. The operating system runs on hardware set 401, which, in this embodiment, includes multiple processors (not separately shown). The ActSafe app provides an ActSafe service according to an embodiment of the present disclosure. More specifically, the ActSafe app performs actions and/or provides notifications to help avoid the intrusion of fraudware and/or mitigate the effects of fraudware embedded in and/or acting through, the other mobile apps including apps 404, and critical app 408. Accordingly, the ActSafe app is given necessary permissions to monitor behavior of the other mobile apps on the device. In some embodiments of the present invention, permissions include access to the operation of the app at runtime (and in the background), such as URLs accessed by the app, data types/content being sent or received, API access permissions granted by the user that are exploited by the App, etc. In some embodiments of the present invention, the ActSafe API is part of the operating system. The ActSafe API is an alternative to loading the API itself into the mobile App itself (that is, as part of the device shipped software development kit).

ActSafe cloud service 502 is a cloud-based service, in one embodiment of the present invention. Alternatively, in another embodiment, the ActSafe cloud service is a component in an app store. ActSafe cloud service 502 accumulates a global collection of threat intelligence. In some embodiments, it receives input from various components such as: operating devices including desktop computer 504; laptop computer 506; tablet computer 508; ActSafe administrator's computer 510; and/or users 512. The ActSafe cloud service provides a service by which app stores can gather threat data about an operational app.

A method according to the present disclosure includes the following interactions and operations: (i) user 512 downloads critical app 408 from app store 604a, and installs the app onto mobile device system 402; (ii) ActSafe API 410a, monitors activity on the mobile device system, including the behavior of critical app 408; (iii) the ActSafe API communicates app 408 behavior information to ActSafe cloud service 502; (iv) the behavior information includes information about communications and/or operations that involve app 408 (for example, outbound IP (internet protocol) addresses, URLs, cross-app calls, etc.) that may influence the reputation of app 408 itself. In some embodiments of the present invention, the operations that are being performed by an app are cross-referenced with global threat intelligence data and the app threat level is rated. For example, if an app communicates with known anonymization services, then this is reflected in the metadata associated with the app (or update) in the ActSafe cloud service. The interface then provided to the app stores simply allows the app store to query a particular app (version's) effect of installing on an end user's device. ActSafe cloud service makes this data available to the registered app store (or services) as a public API.

In some embodiments of the present invention, ActSafe cloud service 502 interoperates with threat services 608a and 608b, to build up a security profile relative to an app's operation. The security profile includes, for example, IP address reputation checks of the various outbound IP addresses being used, as well as categorization of such calls. Products within threat services 608a and 608b also provide data that identifies suspicious behavior of an app operating on a device by way of analyzing call sequences. In some embodiments, a set of "other threat services" (not shown) federates such information, including whitelist and blacklist monitoring, across all data feeds.

In some embodiments of the present invention, in response to installation of an app update, post-install behavioral characteristics are analyzed by ActSafe cloud service 502 against previous operational app footprints. The analysis: (i) allows for risk to be associated with application of app updates; and/or (ii) mitigates the threat of malware propagation (through, for example, unauthorized app store updates). In some embodiments, once an app has been operating consistently for a pre-determined period of time, the reporting burden, from ActSafe API 410, to ActSafe cloud service 502, is reduced. In this way, the solution caters to situations, such as app update(s), where maximum malware threat(s) to a device may exist.

In some embodiments of the present invention, once an app's operational threat characteristics are known across multiple installed devices, an app store categorizes and highlights such characteristics to a new end user who wishes to install the app. This is done, as before, by calling ActSafe cloud service 502. Alternatively, in some embodiments, in an ActSafe-integrated app store, the categorized threat data is associated with the app itself.

Some embodiments of the present invention may include one, or more, of the following features, characteristics and/or advantages: (i) uses enterprise threat intelligence to appropriately categorize and publicize (to potential victims) known risks exhibited by the installation or update of an app on the full set of installed devices; (ii) provides information to enable a user to make an informed decision relative to the level of risk involved with installing an app on their device; (iii) informs a user, and gives the user a choice (to install/update or to refrain from installing/updating an app); and/or (iv) informs a user if the app exhibits a particular vulnerability yet poses no threat when run on a specific device.

Some embodiments of the present invention provide the ability of a single user to have control over what apps get installed on their own device, based on the threat posture presented by the same apps when running on other user's devices. An enterprise may be interested in the ActSafe API's general view of the vulnerability of an employee's platform, and apply security policies to that which forbid users from installing certain apps. The enterprise may have a role to play in controlling which actions are permissible, based on the user's devices. The enterprise may even forbid apps from being installed based on the public ActSafe Service information about the app.

Some embodiments of the present invention may include one, or more, of the following features, characteristics and/or advantages: (i) provides any pre-installation intelligence data that can be displayed to a prospective user on the effects of installing an app; (ii) focuses on using threat intelligence data (specifically IP address reputation, application (service) identification, fraud, URL reputation (categorization)) to inform the end user of specific threats to which the app is known to be vulnerable; (iii) provides the user a choice to continue and install/update the app, knowing that an identified threat exposes no risk to the particular device; and/or (iv) focuses on publication of a threat metric indicator for apps residing in an app store, such that users can get an indicative threat view of a particular app prior to installing or updating the app.

Some embodiments of the present invention may include one, or more, of the following features, characteristics and/or advantages: (i) publishes a threat metric indicator for apps residing in an app store; (ii) gives users an indicative threat view of a particular app prior to installing or updating the app; (iii) takes a malware state of an app as input to the threat metric indicator; (iv) further inputs to the threat metric indicator include behavioral monitoring (by the app platform itself) of apps; and/or (v) uses this behavioral data to determine exploits occurring across a broad set of installed device environments.

Some embodiments of the present invention may include one, or more, of the following features, characteristics and/or advantages: (i) uses behavioral characteristics of apps running on existing devices to determine a threat score; and/or (ii) publishes the threat score to the user, who may then decide to install/update the app or refrain from installing/updating the app.

Some embodiments of the present invention may include one, or more, of the following features, characteristics and/or advantages: (i) provides to an end user a behavioral based threat view of an app, prior to the user installing/updating the app; (ii) enables the user to decide to install/update or refrain from installing/updating the app on the device; (iii) gives a user an indication if an app is malicious before the app is actually installed and operated on a device; (iv) uses data reported from "real" user devices, the data based on actual app usage "in the field"; and/or (v) implementations a third party threat service for mobile apps.

Some embodiments of the present invention may include one, or more, of the following features, characteristics and/or advantages: (i) provide a method for analyzing run time characteristics of an app across multiple devices, for the purpose of presenting the risk characteristics the app represents to their device; (ii) collects and reports, to a central repository (for example, to an app store), app behavioral data (for example external URLs accessed, etc.) on a device; (iii) a central repository (for example an app store) correlates app behavioral data (across installed devices) against known threat intelligence sources; (iv) associates identified threat categories with app metadata within the repository; and/or (v) displays to consumers app metadata representing known threats for a requested app operations (for example, install, update or automatic update).

Some embodiments of the present invention detect changes in behavior of an app from one version to another (suggesting exploitation of permissions that have been granted). Examples of this aspect include the operation of an app in accessing GPS while the app runs in the background. Some embodiments focus on general app behavior rather than focusing on a platform's ability to allow an app to behave in a particular way.

In one embodiment, a clean device type baseline test of installation (or update) of an app is used to develop information used by the ActSafe service (relative to new apps or app updates) and is a part of the process for approving an app on the app store.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Enterprise: An entity that provides mobile access to devices/computers installed with apps. Such an entity is responsible for fulfilling security policies in accordance with their corporate objectives. Fulfilling such security policies includes the ability to control which devices/computers are provided access to which Enterprise services.

Member of an enterprise: any entity (for example, human person) that interacts with the enterprise; membership in an enterprise does not require an employment relationship with the enterprise or a contractual relationship with the enterprise.

Device type: any set of device hardware, firmware and/or software, or specific configurations (for example, app permissions, wireless access, etc.) to augment, that define a type of device such that devices of the same type are similar with respect to risk of threats (for example, fraudware) associated with various apps; a set of device types may, or may not, be mutually exclusive such that a given device will belong to only one type.

Mobile device application (app): a mobile application is computer software that runs on at least one type of mobile device; the app may, or may not, also run on other types of computer devices that are not mobile devices.

What is claimed is:

1. A method for use with a first mobile device application (first app) suitable for running on devices of at least a first device type, the method comprising:
   collecting first-device-type risk-relevant data associated with a first app from a first plurality of devices, with each device of the first plurality of devices being of the first device type;
   analyzing the first-device-type risk-relevant data to generate first-device-type risk characteristic data corresponding to the first device type;
   associating the first-device-type risk characteristic data as first risk metadata with the first app;
   collecting, for each device type of a set of device type(s) corresponding to the app, device-type-specific risk-relevant risk data associated with the app and a respective device type;
   analyzing, for each device type of the set of device type(s) corresponding to the app, a respectively corresponding device-type-specific risk-relevant data to generate respectively corresponding device-type-specific risk characteristic data associated with the app and the respective device type; and
   associating, for each device type of the set of device type(s) corresponding to the app, the respectively corresponding device-type-specific risk characteristic data as device-type specific risk metadata with the app;
   wherein:
   the first app is one of a plurality of apps that is used by members of an enterprise; and
   each app of the plurality of apps is suitable for running on a respectively corresponding set of device type(s).

2. The method of claim 1 further comprising:
   storing all apps of the plurality of apps and all device-type-specific risk metadata in a common repository.

3. The method of claim 2 wherein the common repository has at least one of the following characteristics: the common repository is a central repository for the enterprise and/or the common repository is an app store.

4. The method of claim 1 wherein the collection of device-type-specific risk-relevant data includes a collection of external URLs (uniform resource locators) accessed.

5. The method of claim 1 wherein the analysis of the respectively corresponding device-type-specific risk-relevant data includes:
   correlating the respectively corresponding device-type-specific risk-relevant data against a set of enterprise threat intelligence source(s).

6. The method of claim 1 wherein:
   the analysis of the respectively corresponding device-type-specific risk-relevant data includes identifying threat categories; and
   the device-type-specific risk metadata includes identified threat categories.

7. The method according to claim 1 further comprising:
   presenting, in human understandable form to a human user, a device-type-specific risk metadata corresponding to at least one app and at least one device type of the set of device type(s) corresponding to the at least one app.

8. The method of claim 1 wherein the device-type-specific risk-relevant data includes device-type-specific run time behavioral data.

9. A computer program product for use with a first mobile device application (first app) suitable for running on devices of at least a first device type, the computer program product comprising a non-transitory computer readable storage medium having stored thereon:
   first program instructions programmed to collect first-device-type risk-relevant data associated with the first app from a first plurality of devices, with each device of the first plurality of devices being of the first device type;
   second program instructions programmed to analyze the first-device-type risk-relevant data to generate first-device-type risk characteristic data corresponding to the first device type;
   third program instructions programmed to associate the first-device-type risk characteristic data as first risk metadata with the first app;
   fourth program instructions programmed to collect, for each device type of a set of device type(s) corresponding to the app, device-type-specific risk-relevant risk data associated with the app and a respective device type;
   fifth program instructions programmed to analyze, for each device type of the set of device type(s) corresponding to the app, a respectively corresponding device-type-specific risk-relevant data to generate respectively corresponding device-type-specific risk characteristic data associated with the app and a respective device type; and
   sixth program instructions programmed to associate, for each device type of the set of device type(s) corresponding to the app, a respectively corresponding device-type-specific risk characteristic data as device-type specific risk metadata with the app;
   wherein:
   the first app is one of a plurality of apps that is used by members of an enterprise; and
   each app of the plurality of apps is suitable for running on a respectively corresponding set of device type(s).

10. The computer program product of claim 9 further comprising:

seventh program instructions programmed to store all apps of the plurality of apps and all device-type-specific risk metadata in a common repository.

11. The computer program product of claim 10 wherein the common repository has at least one of the following characteristics: the common repository is a central repository for the enterprise and/or the common repository is an app store.

12. The computer program product of claim 9 wherein the collection of device-type-specific risk-relevant data includes a collection of external URLs (uniform resource locators) accessed.

13. The computer program product of claim 9 wherein the analysis of the respectively corresponding device-type-specific risk-relevant data includes:
   seventh program instructions programmed to correlate the respectively corresponding device-type-specific risk-relevant data against a set of enterprise threat intelligence source(s).

14. A computer system for use with a first mobile device application (first app) suitable for running on devices of at least a first device type, the non-transitory computer system comprising:
   a processor(s) set; and
   a computer readable storage medium;
   wherein:
   the processor(s) set is structured, located, connected and/or programmed to run program instructions stored on the computer readable storage medium; and
   the program instructions include:
      first program instructions programmed to collect first-device-type risk-relevant data associated with the first app from a first plurality of devices, with each device of the first plurality of devices being of the first device type,
      second program instructions programmed to analyze the first-device-type risk-relevant data to generate first-device-type risk characteristic data corresponding to the first device type,
      third program instructions programmed to associate the first-device-type risk characteristic data as first risk metadata with the first app,
      fourth program instructions programmed to collect, for each device type of a set of device type(s) corresponding to the app, device-type-specific risk-relevant risk data associated with the app and a respective device type,
      fifth program instructions programmed to analyze, for each device type of the set of device type(s) corresponding to the app, a respectively corresponding device-type-specific risk-relevant data to generate respectively corresponding device-type-specific risk characteristic data associated with the app and a respective device type, and
      sixth program instructions programmed to associate, for each device type of the set of device type(s) corresponding to the app, a respectively corresponding device-type-specific risk characteristic data as device-type specific risk metadata with the app;
   wherein:
   the first app is one of a plurality of apps that is used by members of an enterprise; and
   each app of the plurality of apps is suitable for running on a respectively corresponding set of device type(s).

15. The computer system of claim 14 further comprising:
   seventh program instructions programmed to store all apps of the plurality of apps and all device-type-specific risk metadata in a common repository.

16. The computer system of claim 15 wherein the common repository has at least one of the following characteristics: the common repository is a central repository for the enterprise; and/or the common repository is an app store.

17. The computer system of claim 14 wherein the collection of device-type-specific risk-relevant data includes a collection of external URLs (uniform resource locators) accessed.

18. The computer system of claim 14 wherein the analysis of the respectively corresponding device-type-specific risk-relevant data includes:
   seventh program instructions programmed to correlate the respectively corresponding device-type-specific risk-relevant data against a set of enterprise threat intelligence source(s).

* * * * *